United States Patent [19]
Densow

[11] 3,810,533
[45] May 14, 1974

[54] TORQUE REDUCING CENTRIFUGAL CLUTCH

[75] Inventor: Ulrich O. Densow, Peterborough, Ontario, Canada

[73] Assignee: Outboard Marine Corporation, Waukegan, Ill.

[22] Filed: July 2, 1973

[21] Appl. No.: 375,713

[52] U.S. Cl............... 192/105 BA, 192/105 CD, 192/103 B, 192/55
[51] Int. Cl. .. F16d 43/14, F16d 43/06, F16d 43/24
[58] Field of Search......... 192/105 BA, 105 CD, 55, 192/45.1, 103 B

[56] References Cited
UNITED STATES PATENTS

| | | |
|---|---|---|
| 3,393,781 | 7/1968 | Miura............... 192/105 CD X |
| 3,262,533 | 7/1966 | Keller et al............ 192/105 BA |
| 3,145,817 | 8/1964 | Randall............... 192/105 BA |
| 2,851,893 | 9/1958 | Putz.................. 192/105 BA |
| 1,689,913 | 10/1928 | Carrey................ 192/105 BA |

Primary Examiner—Samuel Scott
Assistant Examiner—Lance W. Chandler
Attorney, Agent, or Firm—Michael, Best & Friedrich

[57] ABSTRACT

Disclosed herein is a centrifugal clutch including yieldable means connecting a drive element and a clutch shoe driver for rotating the clutch shoe driver in response to rotation of the drive element, together with means on a plurality of clutch shoes and on the clutch shoe driver for rotatably driving the clutch shoes and for guiding the clutch shoes for outward movement radially and angularly relative to the clutch shoe driver in response to clutch shoe rotation from a retracted position spaced from a clutch drum to an extended position in wedged driving engagement with the clutch drum, and means on the drive element limiting angular movement of the clutch shoes relative to the drive element, whereby thereafter to effect driving engagement by reason of centrifugal action as compared to wedging action and to thereby reduce torque transmission.

7 Claims, 10 Drawing Figures

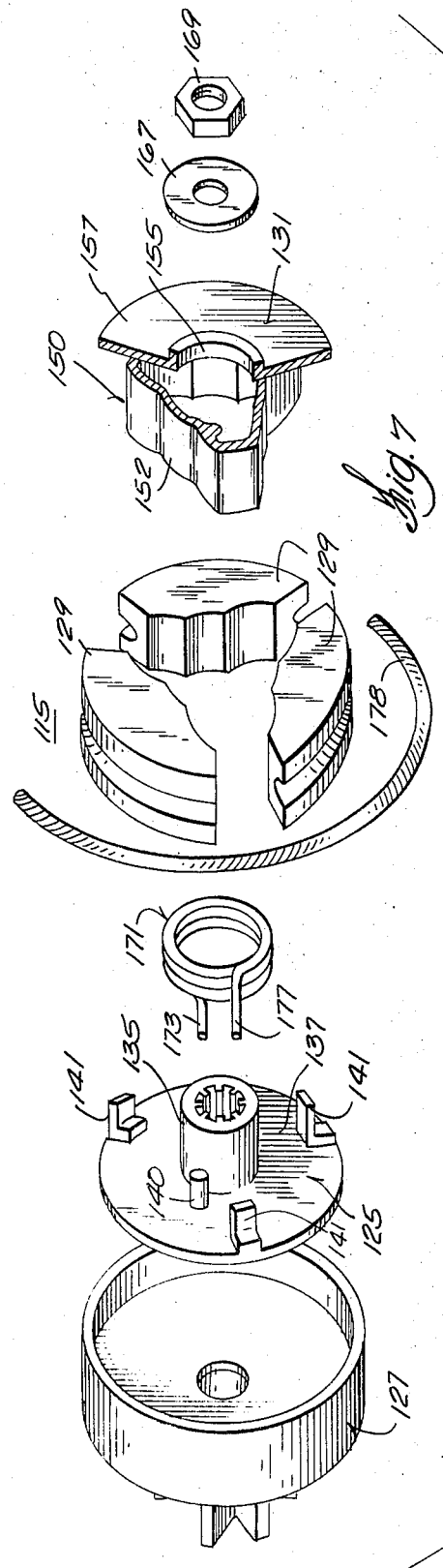
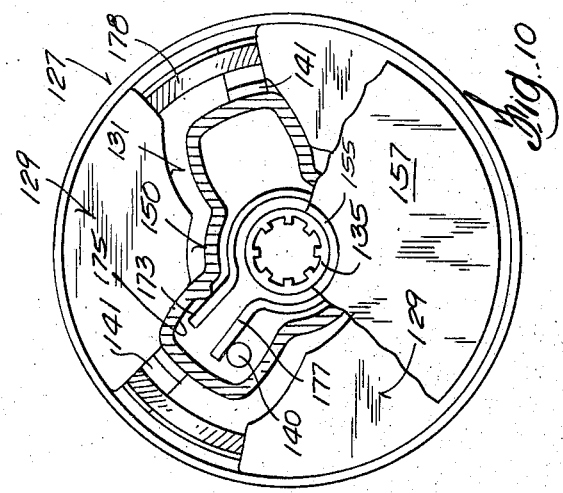
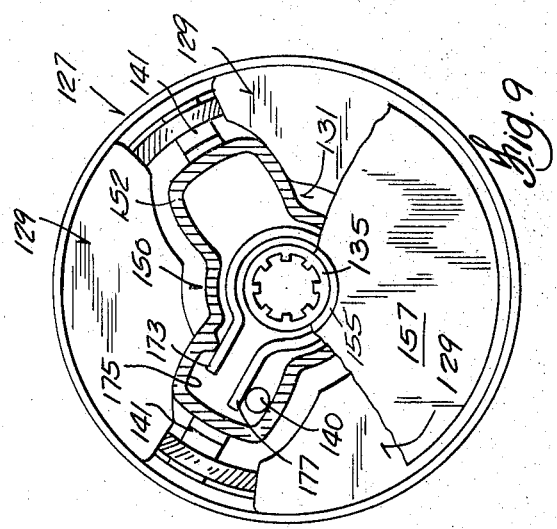
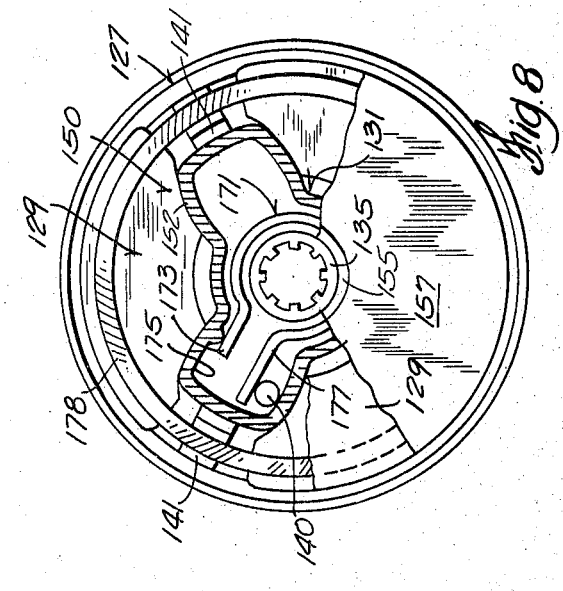

TORQUE REDUCING CENTRIFUGAL CLUTCH

BACKGROUND OF THE INVENTION

The invention relates generally to chain saws and to centrifugal clutches for chain saws.

It is common practice to drive the saw chain of a chain saw from an internal combustion engine through a centrifugal clutch. Such clutches can engage with either a simple centrifugal action or with a wedging action. In clutches having a centrifugal action, means are normally provided for limiting clutch shoe outward movement to simple radial movement. In clutches having a wedging action, outward clutch shoe movement is both radial and angular to effect the wedging action. Clutches with wedging action are capable of transmitting considerably higher torque loads, at the same rate of rotation, than clutches with centrifugal action. Both types of clutches exhibit increasing torque transmission with increasing speed. Curves showing typical torque transmission capabilities of wedging action clutches and centrifugal action clutches are identified respectively by letters "B" and "C" in FIG. 2.

SUMMARY OF THE INVENTION

The invention provides a chain saw including a centrifugal clutch which initially provides driving engagement with a wedging action, but which, above a given torque load, gradually converts from a wedging action to a simple centrifugal action so as to reduce the level of torque which can be transmitted back to the engine in the event the saw chain is stopped or stuck in the work.

More specifically, in accordance with the invention, there is provided a chain saw having a centrifugal clutch including yieldable means connecting a drive element and a clutch shoe driver for rotating the clutch shoe driver in response to rotation of the drive element, together with means on a plurality of clutch shoes and on the clutch shoe driver for rotatably driving the clutch shoes in response to clutch shoe driver rotation and for guiding the clutch shoes for movement radially and angularly relative to the clutch shoe driver in response to clutch shoe rotation from a retracted position spaced from the clutch drum to an extended position in wedged driving engagement with the clutch drum, and means on the drive element for engagement with the clutch shoes to limit angular movement of the clutch shoes relative to the drive element so as to initiate conversion of the driving engagement of the clutch shoes from a wedging action to a centrifugal action after a given amount of angular movement of the clutch shoes relative to the drive element.

In further accordance with the invention, the means for yieldably connecting the drive element to the clutch shoe driver comprises a spring. Such a spring can be a helical spring arranged for yielding in response to either tension or compression. The torque level at which torque transmission is reduced due to conversion from a wedged driving engagement to a centrifugal driving engagement is determined by the spring constant.

Still further in accordance with the invention, the clutch shoe driver is mounted on the drive element for rotation relative thereto.

One of the principal features of the invention is the provision of a chain saw including a centrifugal clutch which reduces torque transmission above a predetermined loading for a given rotational speed.

Another of the principal features of the invention is the provision of a centrifugal clutch in which driving engagement is initiated by wedging action, and in which, upon increasing torque transmission, engagement of the clutch is converted from a wedging action to a centrifugal action.

Other features and advantages of the invention will become known by reference to the following drawings, general description and claims.

DRAWINGS

FIG. 7 is an exploded perspective view, with parts broken away, of a second embodiment of a centrifugal clutch in accordance with the invention.

FIG. 8 is an end view, with parts broken away, showing the components of the centrifugal clutch shown in FIG. 7 when in the idle condition.

FIG. 9 is a view similiar to FIG. 8 showing the components immediately upon driving engagement.

FIG. 10 is a view similiar to FIGS. 8 and 9 showing the components when the engaging action is being converted from a wedging action to a centrifugal action.

Figure 2:
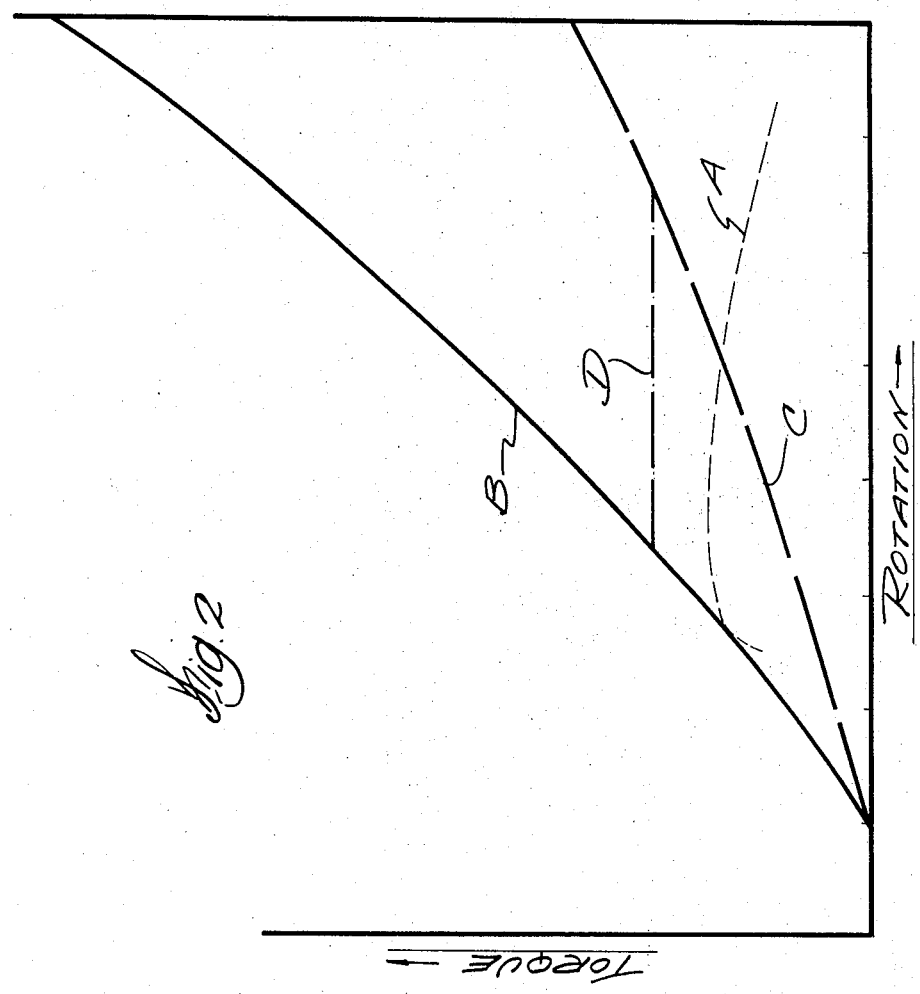
FIG. 2 is a graph illustrating the operation of a centrifugal clutch in accordance with the invention.

Before explaining the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

GENERAL DESCRIPTION

Figure 1:
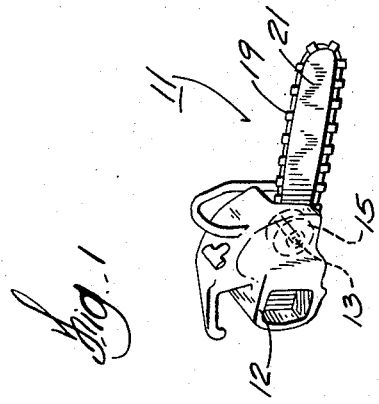
FIG. 1 is a perspective view of a chain saw embodying a centrifugal clutch in accordance with the invention.

Shown in FIG. 1 is a chain saw 11 which is in accordance with the invention, and which includes a frame 12 supporting an engine (not shown) driving a shaft 13 supporting a centrifugal clutch 15 connected to a sprocket (not shown) around which is trained a saw chain 19 guided for travel by a cutter bar 21.

Figure 3:
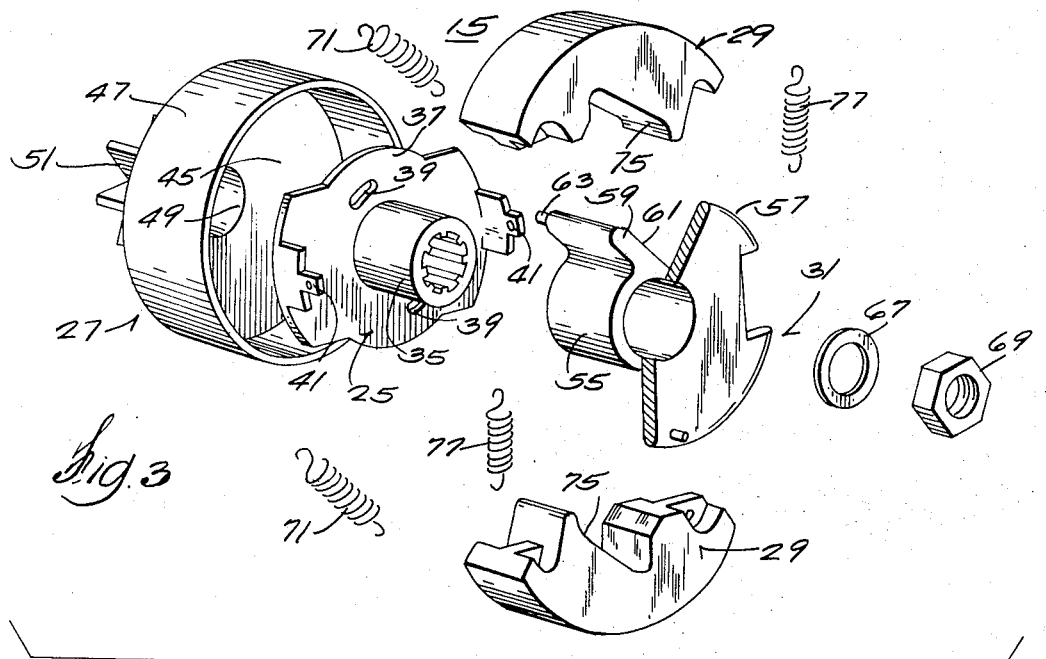
FIG. 3 is an exploded perspecitve view, with parts broken away, of one embodiment of a centrifugal clutch in accordance with the invention.

The centrifugal clutch 15, shown in FIG. 1, is constructed in accordance with the invention and includes, as seen best in FIG. 3, a drive element 25 adapted to be supported on and for common movement with the drive shaft 13. Also included in the clutch 15 is a clutch drum 27 which is adapted to be supported for rotation co-axially with and independentally of the drive element 25. The clutch 15 further includes a plurality of clutch shoes 29, together with a clutch shoe driver 31 and cooperating means on the clutch shoe driver 31 and on the clutch shoes 29 for rotating the clutch shoes 29 in response to driver rotation and for guiding the clutch shoes 29 for movement, in response to rotation thereof, radially and angularly relative to the drive element 25 and to the clutch shoe driver 31 between an inner or retracted position spaced from the clutch drum 27 and an outer or extended position in driving engagement with the clutch drum 27.

Also in accordance with the invention, there is provided yieldable means for rotating the clutch shoe driver 31 in the same direction and in response to drive element rotation, and means for limiting angular movement of the clutch shoes 29 relative to the drive element 25.

More specifically, in the construction illustrated in FIG. 3, the drive element 25 includes a hub 35 which is bored and splined to facilitate mounting on, and rotation in common with, the drive shaft 15. Extending from the hub 35 is a disk portion 37 including a pair of diametrically opposed and arcuately extending slots or apertures 39 and a pair of diametrically opposed and axially extending stops 41.

The clutch drum 27 includes a hub 49 having a bore adapted to be journaled on a part of the drive shaft 15 adjacent to the drive element 25, and a cup including a base or disk 45 supported by the hub 49 and an angular flange 47 extending from the base 45. Suitably connected to the clutch drum 27 is a chain sprocket 51.

Rotatably mounted on the hub 35 of the drive element 25 is the clutch shoe driver 31 which includes a hub 55, a radial flange 57 extending from the hub 55, and two opposed wings 59 (one shown) projecting axially from the flange 57 and having respective surfaces 61 which extend radially outwardly and rearwardly with respect to the direction of drive element rotation, clockwise in FIGS. 3 through 6. Extending axially from the wings 59 are respective pins 63 which extend into the arcuate slots 39 to afford a range of permissible angular movement between the drive element 25 and the clutch driver 31, and to provide means for limiting relative rotation between the clutch shoe driver 31 and the drive element 25.

The clutch shoe driver 31 can be retained in assembled relation to the drive element 25 by a washer 67 and nut 69 carried on the outer end of the drive shaft 15 which supports the drive element 25 and the clutch drum 27.

Figures 4, 5:
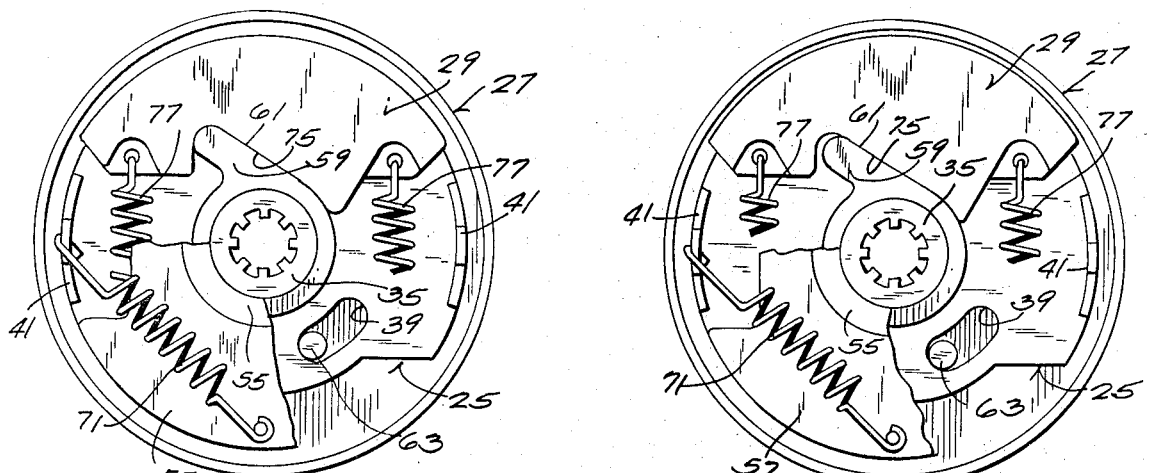
FIG. 4 is an end view, with parts broken away, showing the components of the centrifugal clutch shown in FIG. 3 when in the idle condition.
FIG. 5 is a view similar to FIG. 4 showing the components immediately upon driving engagement.
Figure 6:
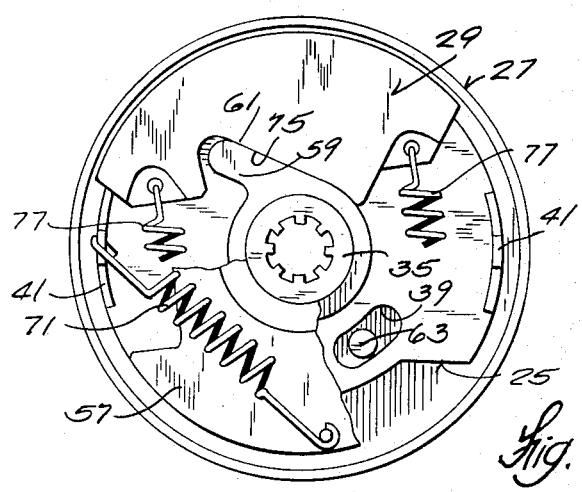
FIG. 6 is a view similar to FIGS. 4 and 5 showing the components when the engaging action is being converted from a wedging action to a centrifugal action.

In the construction illustrated in FIGS. 3 through 6, the means for yieldably rotating the clutch shoe driver 31 in response to drive element rotation comprises one or more helical springs 71 and (preferably two diametrically opposed springs), each having one end anchored to one of the stops 41 and having the other end anchored to the flange 57 of the clutch shoe driver 31. The springs 71 normally urge the drive element 25 and clutch shoe driver 31 toward each other such that, when at idle, the pins 63 engage the clockwise end of the slots 39 as shown in FIG. 4. When the drive element 25 is rotated in the clockwise direction as seen in FIGS. 3 through 6, such movement is transmitted to the clutch shoe driver 31 through the springs 71.

The clutch shoes 29 can be constructed in any suitable manner including an arcuate outer surface adapted to drivingly engage the annular flange 47 of the clutch drum 27 and a surface 75 which cooperates with the clutch driver surface 61 to provide the before mentioned means for rotating the clutch shoes 29 and guiding outward clutch shoe movement. While, in the construction illustrated in FIGS. 3 through 6, two clutch shoes 29 are shown in diametrically opposed relation to each other, the invention is specifically not limited to two shoes.

Means are also provided for restraining the clutch shoes from outward movement from their retracted positions in the absence of rotation above a predetermined speed. In the construction illustrated in FIGS. 2 through 6, such means comprises a pair of diametrically oppositely located helical springs 77 which are anchored, at their ends, to the oppositely located clutch shoes 29.

The means for limiting angular movement of the clutch shoes 29 during their outward movement comprises the before mentioned stops 41 on the drive element 25, which stops 41 are located to engage the adjacent edges of the clutch shoes 29 to prevent further angular movement and thereafter to limit engagement between the clutch shoes 29 and the clutch drum 27 to the centrifugal force developed in response to clutch shoe rotation.

More particularly, in operation, the position of the various components when the clutch 15 is in idle is shown in FIG. 4. Upon rotation of the drive element 25 in the clockwise direction, such rotation will be imparted to the clutch shoe driver 31 through the springs 71. When the rate of rotation exceeds the before mentioned predetermined speed, the clutch shoes 29 will move outwardly to engage the clutch drum 27 and to transmit torque. As the guiding means on the clutch shoe driver 31 and on the clutch shoes 29 does not limit outward clutch shoe movement to strictly radial movement, the clutch shoes 29 move radially outwardly as well as angularly to wedging engagement with the clutch drum 27. Consequently, transmission of force from the drive element 25 through the springs 71, clutch shoe driver 31, clutch shoes 29, and clutch drum 27 will cause extension of the springs 71 (in accordance with the spring constant). Such extension permits angular movement of the clutch driver 31 in the counterclockwise direction relative to the drive element 25. Consequently, the clutch shoes 29 move angularly with the clutch shoe driver 31 relative to the drive element 25. As the amount of angular movement of the clutch shoe driver 31 and clutch shoes 29 is a function of the torque transmitted, increasing torque transmission will cause engagement of the clutch shoes 29 with the stops 41 on the drive element 25 so that thereafter, torque transmission will become principally a function of centrifugal force. As a consequence, the torque transmitted will drop appreciably after engagement of the clutch shoes 29 with the stops 41. As the amount of torque transmitted at the time of engagement between the clutch shoes 29 and the stops 41 is a function of the spring constant of the springs 71, the torque level at which the clutch shoe engaging action is converted from a wedging action to a centrifugal action can be varied by varying the spring constant.

The resulting function of the construction illustrated in FIGS. 3 through 6 is shown in FIG. 2 wherein the vertical scale represents torque which increases upwardly and the horizontal scale indicates drive element rotation which increases to the right. The curve "A" represents the torque curve of a typical small engine adapted for driving a chain saw. The curve "B" represents the torque capability of a centrifugal clutch with wedging action. It will be seen that the curve "B" permits full transmission of torque from close to the beginning of the engine torque curve "A." The curve "C" represents torque capability for a simple centrifugal clutch. It is noted that the curve "A" intersects the curve "C" at a considerably higher speed than the intersection of the curve "A" and the curve "B." The line "D" represents the torque transmitted through the springs 71 at the time of engagement of the clutch shoes 29 with the stops 41 on the drive element 25.

Upon operation, torque transmission proceeds upwardly along the curve "B" until the springs 71 permits engagement of the clutch shoes 29 with the stops 41 on the drive element 25. Thereafter, torque transmission remains substantially constant (along the line "D") as the engaging action of the clutch shoes 29 with respect to the clutch drum 27 is converted from a wedging action to a centrifugal action. Finally, when the line "D" intersects the curve "C," torque transmission again increases.

The invention has particularly utility when the chain 19 driven by the clutch 15 engages an obstruction which causes substantially increased resistance to chain movement and thereby causes increased torque loading on the clutch 15. In accordance with the invention, the torque transmitted rearwardly from the clutch 15 to the engine will not occur in accordance with curve "B" but, instead will be substantially reduced as explained above to thereby substantially protect the engine against excessive torque.

Illustrated in FIGS. 7 through 10 is another centrifugal clutch 115 which is constructed in accordance with the invention, which is adapted to be employed in the chain saw 11, and which includes a drive element 125 including a hub 135, a flange 137, a plurality of clutch shoe stops 141 (three in the construction illustrated in FIGS. 7 through 10) extending axially from the flange 137, and a drive pin 140 which also extends axially from the flange 137.

Rotatably carried on the drive element hub 135 is a clutch shoe driver 131 which includes a central hub 155, a flange 157 extending from the hub 155 and a shoe driving and guiding cam 150 which extends axially from the flange 157 in spaced relation to the hub 155 and such that the drive pin 140 extending from the drive element 125 is located between the hub 155 and the inner surface of the cam 150 (see FIGS. 8 through 10) so as thereby to rotatably drive the clutch shoe driver and to provide means for limiting angular movement between the clutch shoe driver 31 and the drive element 25. The outer surface 152 of the cam 150 cooperates with a plurality of clutch shoes 129 (three in the construction illustrated in FIGS. 7 through 10) to cause clutch shoe rotation in response to clutch shoe driver rotation and to cause radially outward and angular clutch shoe movement in response to clutch shoe rotation to provide wedging engagement of the clutch shoes 129 with a clutch drum 127 which is constructed as disclosed in the embodiment shown in FIGS. 3 through 6.

Means in the form of a garter spring 178 is provided for preventing outward movement of the clutch shoes 129 in the absence of clutch shoe rotation above a predetermined speed.

The clutch shoe driver 131 is retained in assembled relation to the drive element 125 by a washer 167 and nut 169 carried on the outer end of the drive shaft which supports the drive element 125 and the clutch drum 127.

Also included in the clutch 115 is means for yieldably transmitting rotary power from the drive element 125 to the clutch shoe driver 131. In the construction shown in FIGS. 7 through 10, such means comprises a helical spring 171 located in telescopic relation to the clutch shoe driver hub 155 and having one end 173 engaged against the inside surface 175 of the clutch shoe driver cam 150 and having the other end 177 engaged by the drive pin 140 extending from the drive element 125.

The relation of the components when the clutch 115 is at idle is shown in FIG. 8. Upon rotation of the drive element 125 in the clockwise direction as seen in FIGS. 8 through 10, movement of the drive pin 140 in the clockwise direction causes corresponding movement of the helical spring 171 which, in turn, causes correspondingly rotary movement of the clutch shoe driver 131. Upon attainment of the predetermined speed, the clutch shoes 129 will thereafter move radially and angularly outward into wedging engagement with the clutch shoe drum 127. Torque is transmitted through the helical spring 171 and thus, as the transmitted torque increases, the spring ends 173 and 177 will move toward each other, permitting movement of the clutch shoe driver 131 in the counterclockwise direction relative to the drive element 125 until the spring 171 has utilized the full range of its permissible deflection. Prior to such full utilization, the clutch shoes 129 engage the stops 141 so that the driving engagement with the clutch drum 127 is thereafter gradually converted from a wedging action to a simple centrifugal action, thereby materially decreasing torque transmission.

Various of the features of the invention are set forth in the following claims:

What is claimed is:

1. A centrifugal clutch comprising a drive element adapted to be rotatably mounted on a driving shaft, a clutch drum adapted to be supported for rotation co-axially with said drive element, a clutch shoe driver adapted to be supported for rotation co-axially with said drive element, yieldable means connecting said drive element and said clutch shoe driver for rotating said clutch shoe driver in response to rotation of said drive element, and for permitting relative rotation between said clutch shoe driver and said drive element, a plurality of clutch shoes, means on said clutch shoes and on said clutch shoe driver for rotatably driving said clutch shoes in response to clutch shoe driver rotation and for guiding said clutch shoes for outward movement radially and angularly relative to said clutch shoe driver in response to clutch shoe rotation from a retracted position spaced from said clutch drum to an extended position in driving engagement with said clutch drum, and means on said drive element limiting angular movement of said clutch shoes relative to said drive element.

2. A centrifugal clutch in accordance with claim 1 and further including means for preventing outward clutch shoe movement in the absence of rotation of said clutch shoes above a predetermined speed.

3. A centrifugal clutch in accordance with claim 1 wherein said yieldable means comprises a helical spring.

4. A centrifugal clutch in accordance with claim 3 wherein said spring is connected in tension between said drive element and said clutch shoe driver.

5. A centrifugal clutch in accordance with claim 3 wherein said spring is connected in compression between said drive element and said clutch shoe driver.

6. A centrifugal clutch in accordance with claim 1 and further including means for limiting relative rotation between said drive element and said clutch shoe driver.

7. A centrifugal clutch in accordance with claim 1 wherein said means for limiting the angular movement of said clutch shoes comprises stops on said drive element engageable with said clutch shoes in response to relative rotation between said clutch shoe driver and said drive element.

* * * * *